US011120748B2

(12) United States Patent
Kim

(10) Patent No.: US 11,120,748 B2
(45) Date of Patent: Sep. 14, 2021

(54) DISPLAY DEVICE

(71) Applicant: LG Display Co., Ltd., Seoul (KR)

(72) Inventor: Dosung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/115,340

(22) Filed: Dec. 8, 2020

(65) Prior Publication Data

US 2021/0193052 A1 Jun. 24, 2021

(30) Foreign Application Priority Data

Dec. 20, 2019 (KR) ........................ 10-2019-0171935

(51) Int. Cl.

*G06F 1/00* (2006.01)
*G09G 3/3275* (2016.01)
*G09G 3/3266* (2016.01)
*G09G 3/20* (2006.01)
*G09G 3/3233* (2016.01)
*G09G 3/36* (2006.01)

(52) U.S. Cl.

CPC ......... *G09G 3/3275* (2013.01); *G09G 3/2003* (2013.01); *G09G 3/3266* (2013.01); *G09G 3/3233* (2013.01); *G09G 3/3677* (2013.01); *G09G 3/3688* (2013.01); *G09G 2300/0465* (2013.01); *G09G 2310/0291* (2013.01); *G09G 2310/0294* (2013.01); *G09G 2310/0297* (2013.01); *G09G 2310/08* (2013.01)

(58) Field of Classification Search

None

See application file for complete search history.

(56) References Cited

U.S. PATENT DOCUMENTS

2014/0204303 A1* 7/2014 Koide ............... G02F 1/133514 349/43
2019/0340996 A1* 11/2019 Kim ..................... G09G 3/3696

FOREIGN PATENT DOCUMENTS

KR 10-2009-0070324 A 7/2009
KR 10-2014-0109697 A 9/2014

* cited by examiner

*Primary Examiner* — Michael A Faragalla

(74) *Attorney, Agent, or Firm* — Fenwick & West LLP

(57) ABSTRACT

A display device is proposed, the display device including a display panel in which a plurality of unit pixels composed of n sub-pixels (where n is a natural number of 2 or more) connected to a data line and a gate line are arranged; a data driving circuit sequentially outputting n data voltages through a first output channel for one horizontal period; a latch circuit sequentially sampling the n data voltages input through the first output channel and providing the sampled n data voltages simultaneously to n data lines while maintaining the same for one horizontal period including a first time point at which a n-th data voltage is sampled; and a gate driving circuit supplying a scan signal to the gate line in synchronization with the data voltage supplied to the data line.

8 Claims, 13 Drawing Sheets

DISPLAY DEVICE

CROSS REFERENCE TO RELATED APPLICATIONS

The application claims the benefit of Republic of Korea Patent Application No. 10-2019-0171935, filed on Dec. 20, 2019, which is incorporated by reference in its entirety.

BACKGROUND

Field of Technology

The present disclosure relates generally to a display device and, more particularly, to a display device that reduces the number of source driver ICs.

Description of the Related Art

A flat panel display device includes a liquid crystal display device (LCD), an electroluminescence display, a field emission display (FED), a quantum dot display device (QD), and the like. The electroluminescent display device is divided into an inorganic light emitting display device and an organic light emitting display device according to the material of the light emitting layer. A liquid crystal panel and an organic light emitting display panel are mainly used for portable information devices.

As the resolution of the display panel increases, the number of data lines and the number of source driver ICs for driving the data lines increase. As the number of source driver ICs increases, power consumption increases, and the space occupied by the source driver ICs increases, thereby making it difficult to reduce the bezel area.

As a method for reducing the number of source driver ICs, there is a double-rate driving (DRD) method in which two neighboring sub-pixels share one data line and receive scan signals from two different gate lines. However, according to the DRD method, the driving speed of the gate driving circuit driving the scan signal is doubled and the number of gate lines is also doubled, thereby reducing the aperture ratio of the pixel.

As another way for reducing the number of source driver ICs, there is a method of providing a demultiplexer between the source driver IC and the display panel, and selectively latching the channel output through the demultiplexer. According to this method, the driving speed of the gate line does not increase, but the latching timing for the demultiplexer is reduced, so that a large latch TFT should be designed to charge the data line with large loads, whereby there is a limit in reducing the timing. In addition, when the timing is reduced, there is a possibility that data of different colors may be mixed.

SUMMARY

An objective of this disclosure is to provide a display device that reduces the number of source driver ICs.

The specific objective of this disclosure is to provide a method of detecting a micro short circuit between an anode and a cathode of an OLED included in a pixel.

A display device according to an embodiment includes a display panel in which a plurality of unit pixels composed of n sub-pixels (where n is a natural number of 2 or more) connected to a data line and a gate line are arranged; a data driving circuit sequentially outputting n data voltages through a first output channel for one horizontal period; a latch circuit sequentially sampling the n data voltages input through the first output channel and providing the sampled n data voltages simultaneously to n data lines while maintaining the same for one horizontal period including a first time point at which a n-th data voltage is sampled; and a gate driving circuit supplying a scan signal to the gate line in synchronization with the data voltage supplied to the data line.

It is possible to reduce the number of source driver ICs without increasing the driving speed of the display panel, increasing the number of gate lines, and reducing the aperture ratio of the pixels, thereby lowering the cost of the display device.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION

Hereinafter, embodiments will be described in detail with reference to the accompanying drawings.

Throughout the specification, the same reference numbers refer to substantially the same components. In the following description, when it is determined that a detailed description of a known function or configuration related to the contents of this specification may unnecessarily obscure or interfere with the understanding of contents, the detailed description will be omitted.

Figure 1:
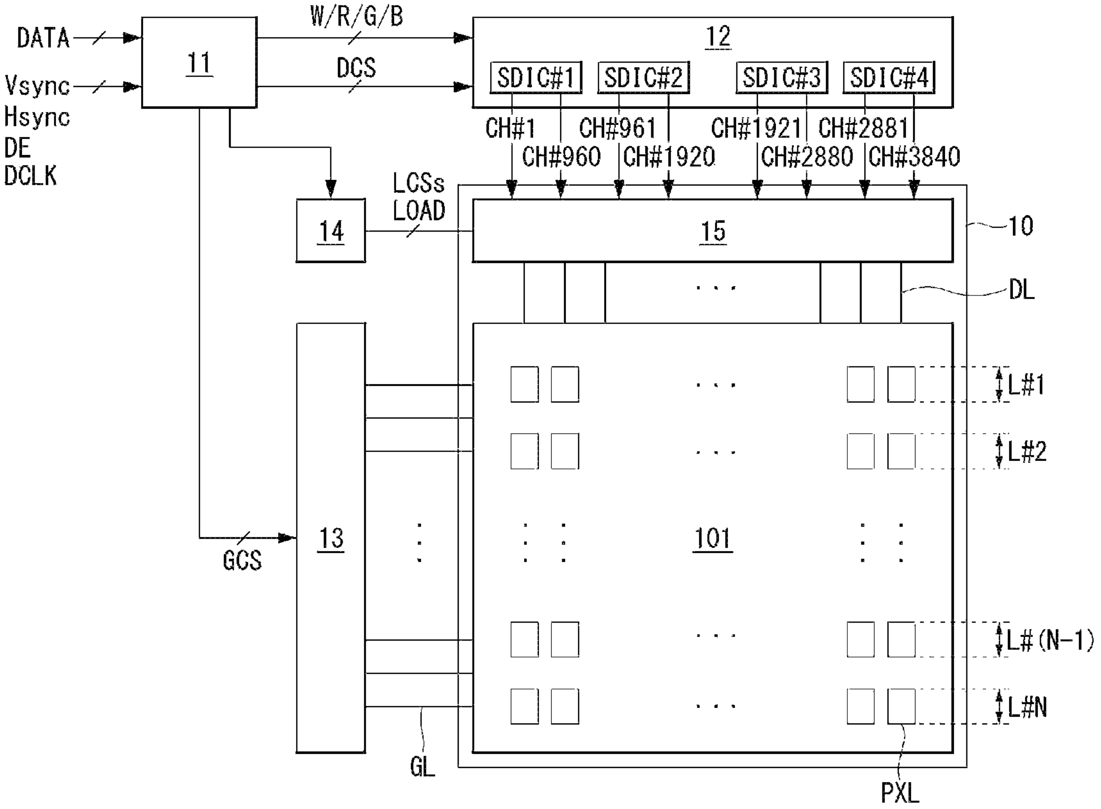
FIG. 1 is a functional block diagram illustrating a display device according to one embodiment.
Figure 2:
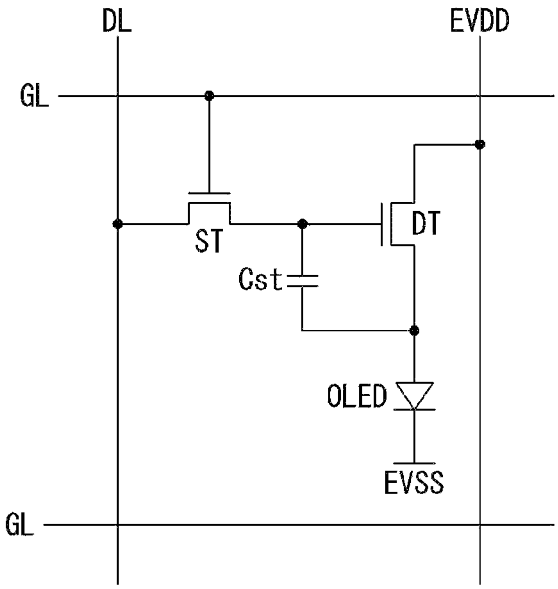
FIG. 2 is an equivalent circuit diagram illustrating a pixel included in an OLED display panel according to one embodiment.
Figure 3:
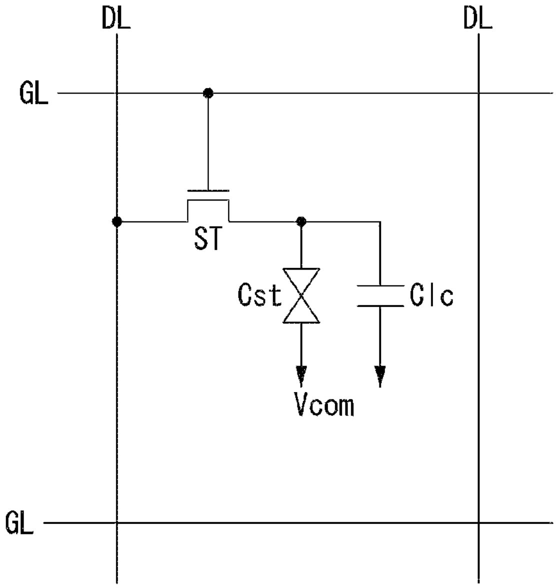
FIG. 3 is an equivalent circuit diagram illustrating a pixel included in a liquid crystal display panel according to one embodiment.

FIG. 1 is a functional block diagram illustrating a display device; FIG. 2 is an equivalent circuit diagram illustrating a pixel included in an OLED display panel; and FIG. 3 is an equivalent circuit diagram illustrating a pixel included in a liquid crystal display panel.

The display device may include a display panel 10, a timing controller 11, a data driving circuit 12, a gate driving circuit 13, a control signal generating circuit 14, and a latch unit 15.

On a screen where an input image is displayed on the display panel 10, a plurality of data lines DLs arranged in a column direction (vertical direction or second direction) and a plurality of gate lines GLs arranged in a row direction (horizontal direction or first direction) intersect with each other, and pixels PXL are arranged in a matrix form for each intersection area, thereby forming a pixel array 101. The scan signals for applying the data voltage supplied to the data line DL to the pixel PXL are supplied to the gate lines GLs.

The display panel 10 may further include a first power supply line for supplying a pixel driving voltage (or high potential power supply voltage EVDD) to the pixels PXL, a second power line for supplying a low potential power voltage EVSS or a common voltage Vcom to the pixels PXLs, and the like. The first and second power lines are connected to a power supply unit (not shown).

Touch sensors may be disposed on the pixel array 101 of the display panel 10. The touch input may be detected using separate touch sensors or may be detected through the pixels. The touch sensors may be placed on a screen AA of the display panel PXL in an on-cell type or an add-on type, or implemented with in-cell type touch sensors embedded in the pixel array.

In the pixel array 101, the pixels PXLs arranged on the same horizontal line are connected to any one of the data lines DLs and any one of the gate lines GLs, thereby forming a pixel line or a display line Li. The pixel PXL is electrically connected to the data line DL in response to a scan signal applied through the gate line GL to receive a data voltage. The pixels PXL disposed on the same pixel line operate simultaneously according to a scan signal applied from the same gate line GL.

The unit pixel, which is the basis for the resolution, is composed of four sub-pixels including R sub-pixel for red color, G sub-pixel for green color, B sub-pixel for blue color, and W sub-pixel for white color or may be composed of three sub-pixels, including R sub-pixel, G sub-pixel, and B sub-pixel, but is not limited thereto. Hereinafter, a pixel may mean a sub-pixel depending on cases.

When the display panel 10 is an OLED panel, each of R/G/B or W/R/B/G sub-pixels has a light emitting element OLED connected between a first line for supplying a high potential power voltage EVDD and a second line for supplying a low potential power voltage EVSS, and a pixel circuit connected to a data line DL and a gate line GL and driving the OLED element, as shown in FIG. 2. The pixel circuit includes at least a switching transistor ST, a driving transistor DT, and a storage capacitor Cst. The switching transistor ST charges a data voltage from the data line DL in the storage capacitor Cst in response to a scan pulse from the gate line GL, and the driving transistor DT controls a current supplied to the OLED according to the voltage charged in the storage capacitor Cst to adjust a light emission amount from the OLED.

When the display panel 10 is a liquid crystal panel, each of R/G/B sub-pixels has a switching transistor ST connected to a data line DL and a gate line GL, and a liquid crystal capacitor Clc and a storage capacitor Cst connected in parallel to the switching transistor ST, as shown in FIG. 3. The liquid crystal capacitor Clc charges a difference voltage between a data voltage supplied to the pixel electrode and a common voltage Vcom supplied to the common electrode through the switching transistor ST, and adjust the light transmittance by driving the liquid crystal according to the charged voltage. The storage capacitor Cst keeps the voltage charged in the liquid crystal capacitor Clc stable.

The timing controller 11 supplies image data DATA transmitted from an external host system to the data driving circuit 12, and herein, rearranges the image data DATA to be transmitted in units of color data. That is, the timing controller 11 provides a line memory separately for each color so that input image data DATA is stored in different line memories separately for each color on a per-line basis, and makes different transmission timing for each color so that the image data W/R/G/B may be supplied to the data driving circuit 12.

In addition, the timing controller 11 receives timing signals such as a vertical synchronization signal Vsync, a horizontal synchronization signal Hsync, a data enable signal DE, and a dot clock DCLK from the host system, and generates control signals for controlling operation timings of the data driving circuit 12 and the gate driving circuit 13. The control signals include a gate timing control signal GCS for controlling the operation timing of the gate driving circuit 13 and a data timing control signal DCS for controlling the operation timing of the data driving circuit 12.

The data driving circuit 12 samples and latches the digital image data W/R/G/B sequentially input in a separate manner for each color from the timing controller 11 on the basis of the data control signal DCS, to be changed to parallel data, and converts the same into an analog data voltage according to a gamma reference voltage through the channels to be output to the data lines DLs. The data voltage may be a value corresponding to a gradation that is to represent a pixel. The data driving circuit 12 may be composed of a plurality of source driver ICs SDICs.

The source driver IC sequentially outputs color data voltages corresponding to color image data through one output channel CH. For example, when white, red, green, and blue W/R/G/B image data are sequentially input from the timing controller 11 on a per-line basis, the source driver IC may sequentially output data voltage corresponding to white, red, green, and blue image data within one horizontal period through the output channel CH.

When a horizontal resolution of the display panel 10 is 3840 corresponding to 4K, and the data driving circuit 12 is composed of four source driver ICs as shown in FIG. 1, each source driver IC may output the data voltage through 3840/4=960 channels CHs.

When the gate driving circuit 13 generates a scan signal on the basis of a gate control signal GCS, the gate driving circuit 13 generates the scan signal in a row sequential manner for an active period and sequentially provides the same to the gate line GL connected to each pixel line. The scan signal from the gate line GL are provided in synchronization with the supply of the data voltage from the data line DL. The scan signal swing between a gate-on voltage VGL and a gate-off voltage VGH.

The gate driving circuit 13 may be configured with multiple gate drive integrated circuits that each includes a shift register, a level shifter for converting an output signal of the shift register to a swing width suitable for driving a TFT of the pixel, an output buffer, etc. Alternatively, the gate driving circuit 13 may be directly formed on the lower substrate of the display panel 10 by a gate drive IC in panel (GIP) method. In the case of the GIP method, the level shifter is mounted on a printed circuit board (PCB), and the shift register may be formed on the lower substrate of the display panel 10.

The control signal generating circuit 14 generates latch control signals LCSs and LOAD for controlling the operation of the latch unit 15 under the control of the timing controller 11.

The latch unit 15 formed in the display panel 10 connects each output channel CH to a plurality of data lines DL, and thus samples and holds a data voltage of each color sequentially input through each output channel CH according to the latch control signal to be simultaneously output to the data line DL of the corresponding color.

A power supply unit not shown adjusts a DC input voltage provided from the host system 20 using a DC-DC converter, to generate a gate-on voltage VGL and a gate-off voltage VGH required for operating the data driving circuit 12 and the gate driving circuit 13, and to generate a high power supply voltage EVDD, a low potential power supply voltage VSS, or a common voltage Vcom required for driving the pixel array.

The host system may be an application processor (AP) in a mobile device, a wearable device, and a virtual/augmented reality device. Alternatively, the host system may be a main board such as a television system, a set top box, a navigation system, a personal computer, and a home theater system, but is not limited thereto.

Figure 4:
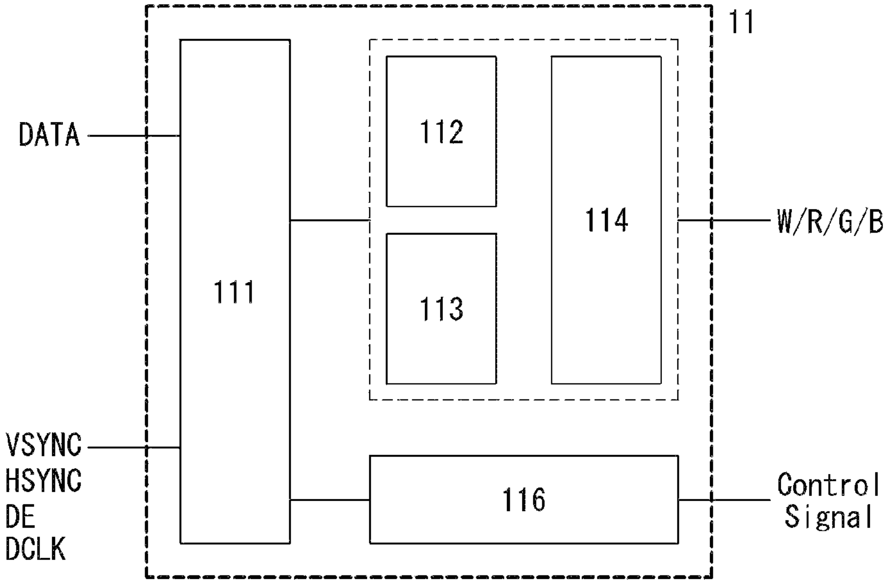
FIG. 4 is a view illustrating an internal configuration of a timing controller that separates color image data to be sequentially output according to one embodiment.
Figure 5:
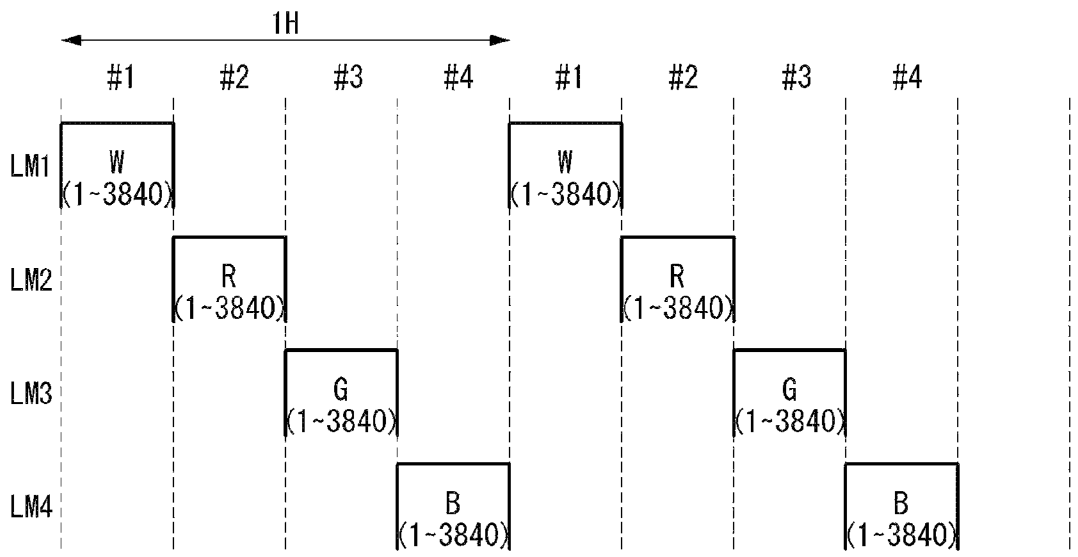
FIG. 5 is a timing diagram illustrating timing in which a timing controller stores color image data in a separate manner for each color to be sequentially output according to one embodiment.

FIG. 4 is a view illustrating an internal configuration of a timing controller that separates color image data to be sequentially output; and FIG. 5 is a timing diagram illustrating timing in which a timing controller stores color image data in a separate manner for each color to be sequentially output.

The timing controller 11 may include a data receiver 111, a data aligner 112, a line memory 113, a data transmitter 114, and a timing signal generator 116.

The data receiver 111 receives image data DATA and a timing signal from the host system.

The data aligner 112 may separate image data DATA to be supplied to sub-pixels constituting one display line for each color and temporarily store the same in the line memory 113 provided for each color.

For example, when a unit pixel is composed of four colors of white, red, green, and blue, the line memory 113 may be composed of four line memories. In addition, when a horizontal resolution of the display panel 10 is 3840 corresponding to 4K, the line memory of each color may store 3840 pieces of image data. That is, the data aligner 112 and the line memory 113 may process input and output of image data corresponding to one horizontal line for one horizontal period 1H.

The data aligner 112 may transmit the image data stored in a separate manner for each color in the line memory 113 to the data driving circuit 12 through the data transmitter 114, in which image data of each color may be output for each period of 1/4H, which is obtained by dividing one horizontal period by the number of colors constituting a unit pixel, four in the example of FIG. 5.

In the example of FIG. 5, 1 to 3840 pieces of white image data are transmitted from the line memory 113 in charge of white color for 1/4H (e.g., period #1); 1 to 3840 pieces of red image data are transmitted from the line memory 113 in charge of red color for the next 1/4H (e.g., period #2); 1 to 3840 pieces of green image data are transmitted from the line memory 113 in charge of green color for the next 1/4H (e.g., period #3); and then 1 to 3840 pieces of blue image data may be transmitted from the line memory 113 in charge of blue color for the next 1/4H (e.g., period #4). The order of colors in which the image data is transmitted may be changed.

The timing signal generator 116 generates a gate control signal GCS and a data control signal DCS from timing signals such as a vertical synchronization signal Vsync, a horizontal synchronization signal Hsync, a data enable signal DE, and a dot clock DCLK provided from the host system, and also generates a control signal that causes the control signal generating circuit 14 to generate latch control signals LCSs and LOAD.

When the timing signal generator 116 and the control signal generating circuit 14 are integrated with each other, the timing signal generator 116 may generate the latch control signals LCSs and LOAD for controlling the operation of the latch unit 15.

Figure 6:
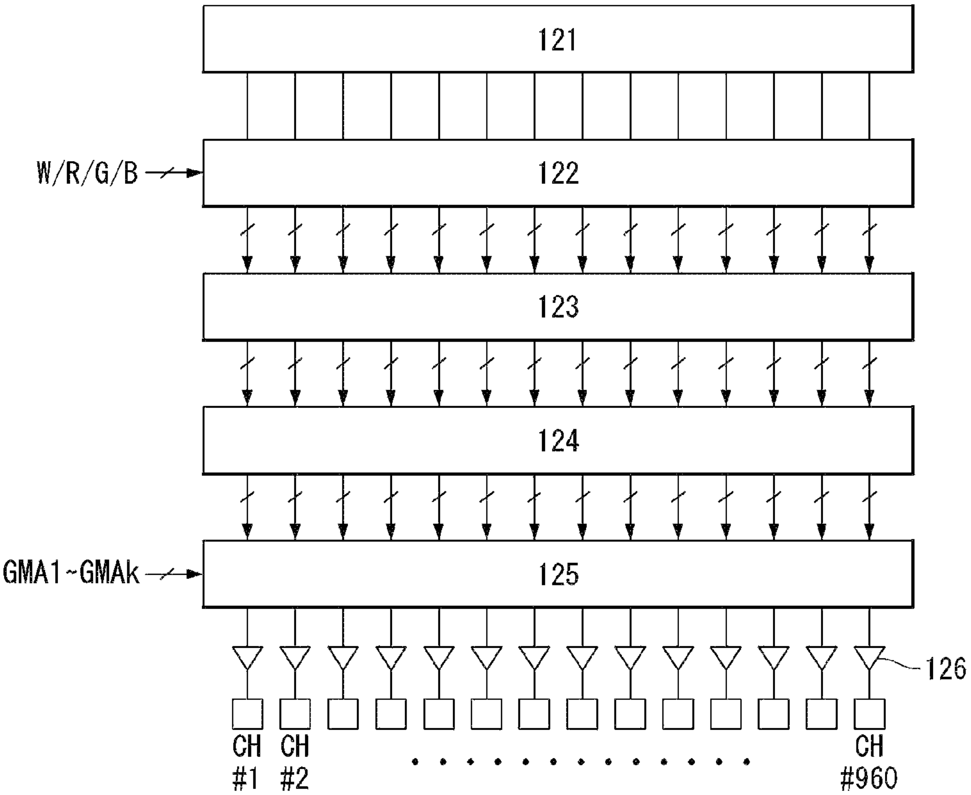
FIG. 6 is a view illustrating a specific configuration of a data driving circuit according to one embodiment.
Figure 7:
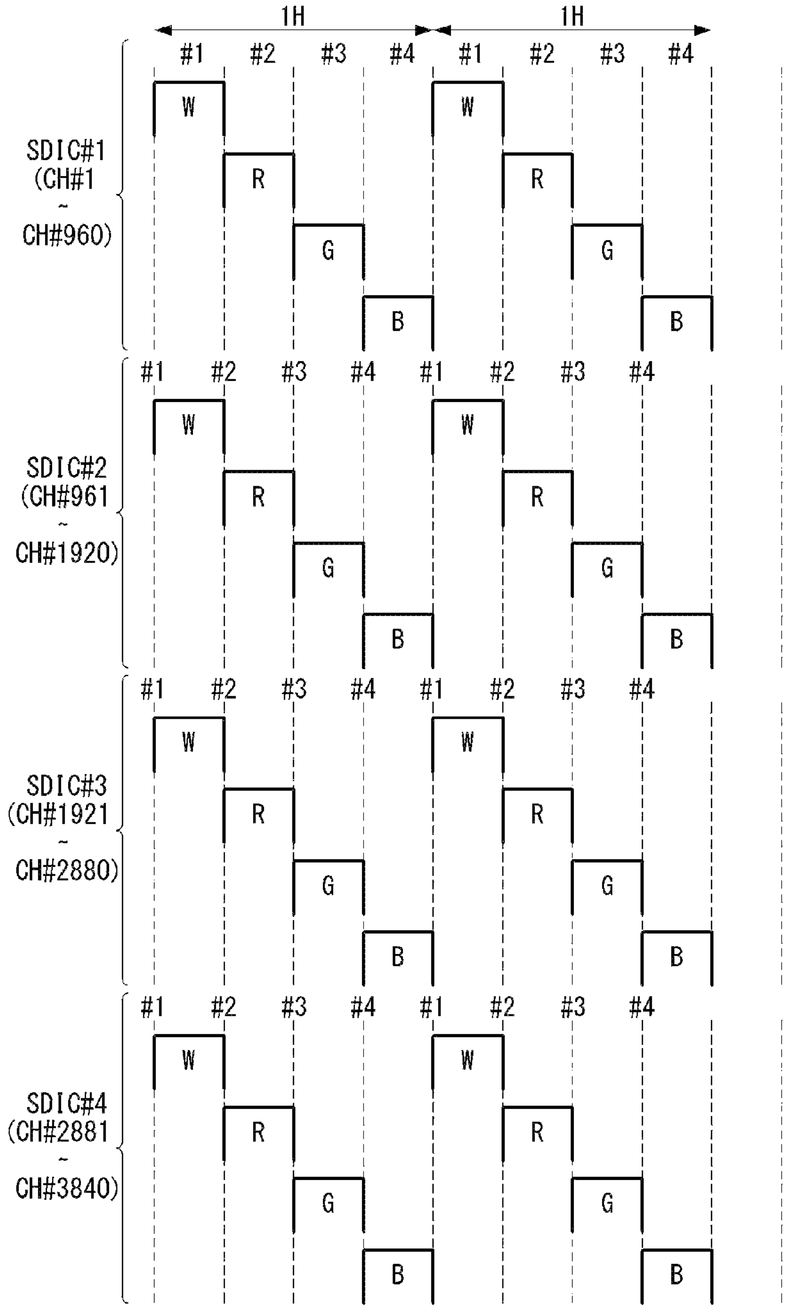
FIG. 7 is a timing diagram illustrating that timing in which a source driver IC sequentially outputs data voltages for each color for one horizontal period according to one embodiment.

FIG. 6 is a view illustrating a specific configuration of a data driving circuit; and FIG. 7 is a timing diagram illustrating that timing in which a source driver IC sequentially outputs data voltages for each color for one horizontal period.

Referring to FIG. 6, the data driving circuit 12 may be configured to include a shift register 121, a first latch 122, a second latch 123, a level shifter 124, a DAC 125, and a buffer 126.

The shift register 121 shifts a clock input from the timing controller 11 to sequentially output the clock for sampling. The first latch 122 samples and latches the pixel data W/R/G/B of the input image at the clock timing for sampling sequentially input from the shift register 121, and outputs the sampled pixel data W/R/G/B at the same time. The second latch 123 simultaneously outputs the pixel data W/R/G/B input from the first latch 122.

The level shifter 124 shifts a voltage of the pixel data W/R/G/B input from the second latch 123 into an input voltage range of the DAC 125. The DAC 125 converts pixel data W/R/G/B from the level shifter 124 into a data voltage on the basis of the gamma compensation voltages GMA1 to GMA and outputs the same. The data voltage output from the DAC 125 is supplied to an output channel CH through the buffer 126.

The data driving circuit 12 of FIG. 6 operates in units of 1/4H horizontal periods (1/4H), when a unit pixel is composed of four color sub-pixels. That is, the data driving circuit 12 outputs data voltages of four colors through one output channel CH for 1H, in such a manner that image data of one color is received from the timing controller 11 through the second latch 122 for 1/4H, and the data voltage of one color is output to the output channel CH through the buffer 126 for 1/4H.

When the data driving circuit 12 includes four source driver ICs and the horizontal resolution of the display panel 10 is 3840, one source driver IC may include 3840/4=960 output channels CHs. Herein, the first source driver IC SDIC #1 is in charge of the first to 960th output channels CH #1 to CH #960, the second source driver IC SDIC #2 is in charge of the 961st to 1920th output channels CH #961 to CH #1920, the third source driver IC SDIC #3 is in charge of the 1921st to 2880th output channels CH #1921 to CH #2880, and the fourth source driver IC SDIC #4 is in charge of the 2881st to 3840th output channels CH #2881 to CH #3840.

Each source driver IC receives image data of four colors four times for 1H, and outputs data voltages of four colors four times through each output channel as shown in FIG. 7.

When white image data W is transmitted from the timing controller 11 for 1/4H, each source driver IC outputs a data voltage V_w corresponding to the white color to the buffer 126 through the first latch 122, the second latch 123, the level shifter 124, and the DAC 125. Herein, a delay of a predetermined time occurs while passing through the first latch 122, the second latch 123, the level shifter 124, and the DAC 125, but the buffer 126 has the data voltage V_w of the white color for 1/4H.

For the next 1/4H after the white image data W is transmitted (e.g., period #2), red image data R is transmitted from the timing controller 11, and a data voltage V_r corresponding to the red color is output to the buffer 126 through the first latch 122, the second latch 123, the level shifter 124, and the DAC 125. Herein, the buffer 126 outputs the data voltage V_r of the red color for the next 1/4H after the buffer 126 outputs the data voltage V_w of the white color.

As shown in FIG. 7, green and blue image data G and B are processed in the same way as the white and red image data W and R, so that data voltages V_g and V_b of the corresponding color are output from the buffer 126 for each 1/4H (e.g., period #3 and period #4).

Figure 8:
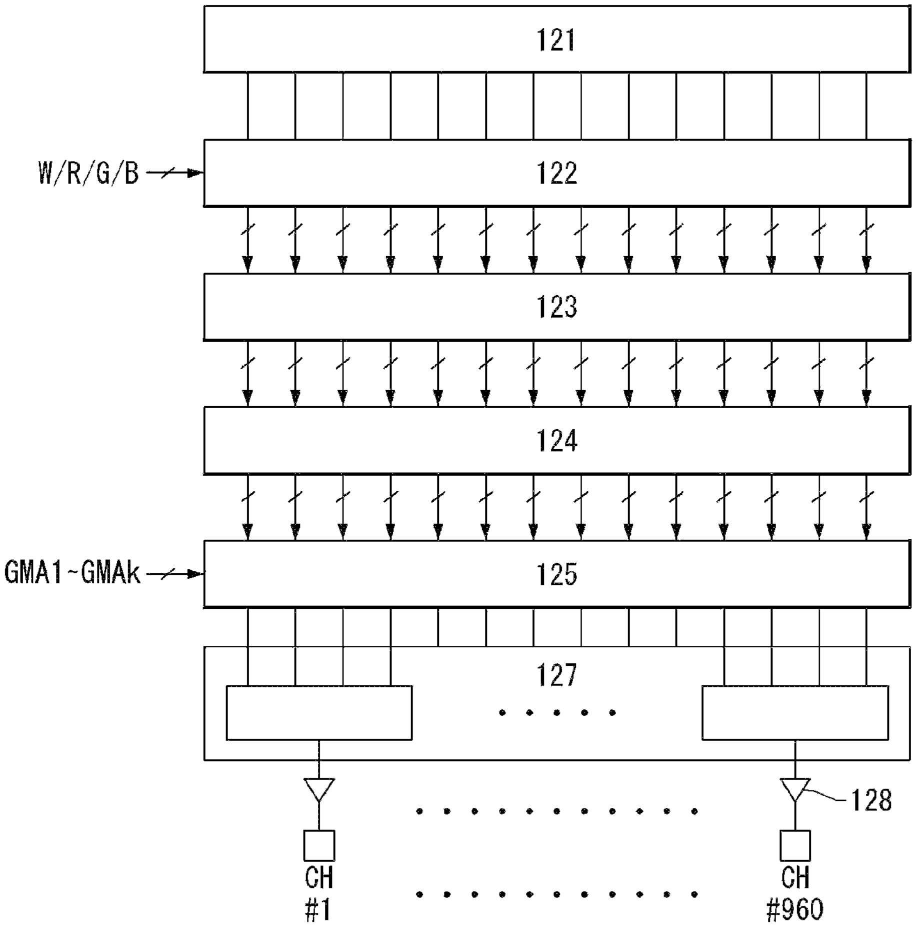
FIG. 8 is a view illustrating another configuration of a data driving circuit according to one embodiment.

FIG. 8 is a view illustrating another configuration of the data driving circuit.

The source driver IC of FIG. 7 receives image data in a separate manner for each color from the timing controller 11 at 1/4H intervals, whereas the data driving circuit of FIG. 8 receives image data of one horizontal line in units of 1H from the timing controller 11 without separating colors. Herein, the timing controller 11 may not require the data aligner 122 and the line memory 113.

The data driving circuit of FIG. 8 may be configured to include a shift register 121, a first latch 122, a second latch 123, a level shifter 124, a DAC 125, a multiplexer 127 and a buffer 128.

The operation of the first latch 121 to the ADC 125 is the same as that of FIG. 6, but the operating frequency is in units of one horizontal period, unlike FIG. 6, which is in units of 1/4H horizontal period.

The multiplexer 127 operates in units of 1/4H horizontal periods to multiplex four outputs, that is, four color data voltages from the ADC 125 and output the same to the buffer 128. More specifically, the multiplexer 127 divides 1H into 4 equal parts, to output white color data voltage for 1/4H, output red color data voltage for next 1/4H, output green color data voltage for next 1/4H, and output blue color data voltage for next 1/4H. The output of each channel is the same as described with reference to FIG. 7.

Figure 9:
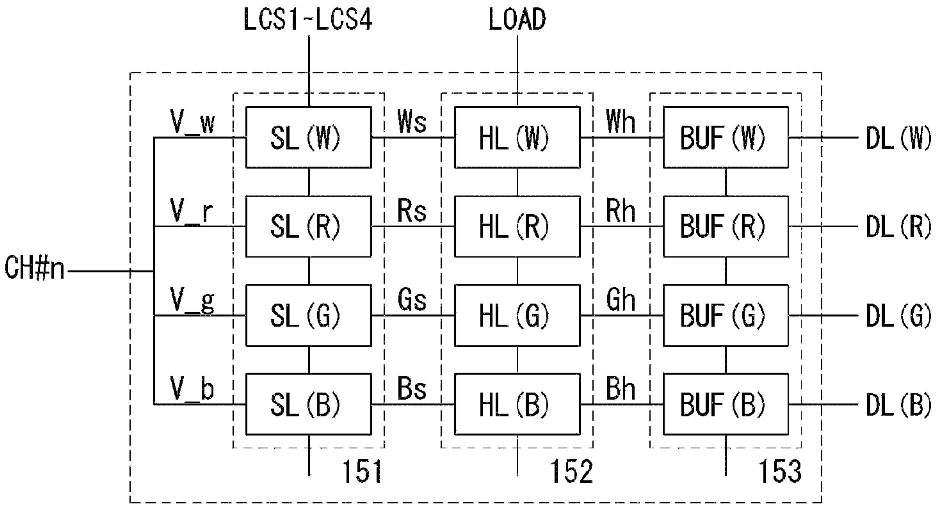
FIG. 9 is a view illustrating a latch unit latching a channel output of a source driver IC to be output to a data line according to one embodiment.
Figure 10:
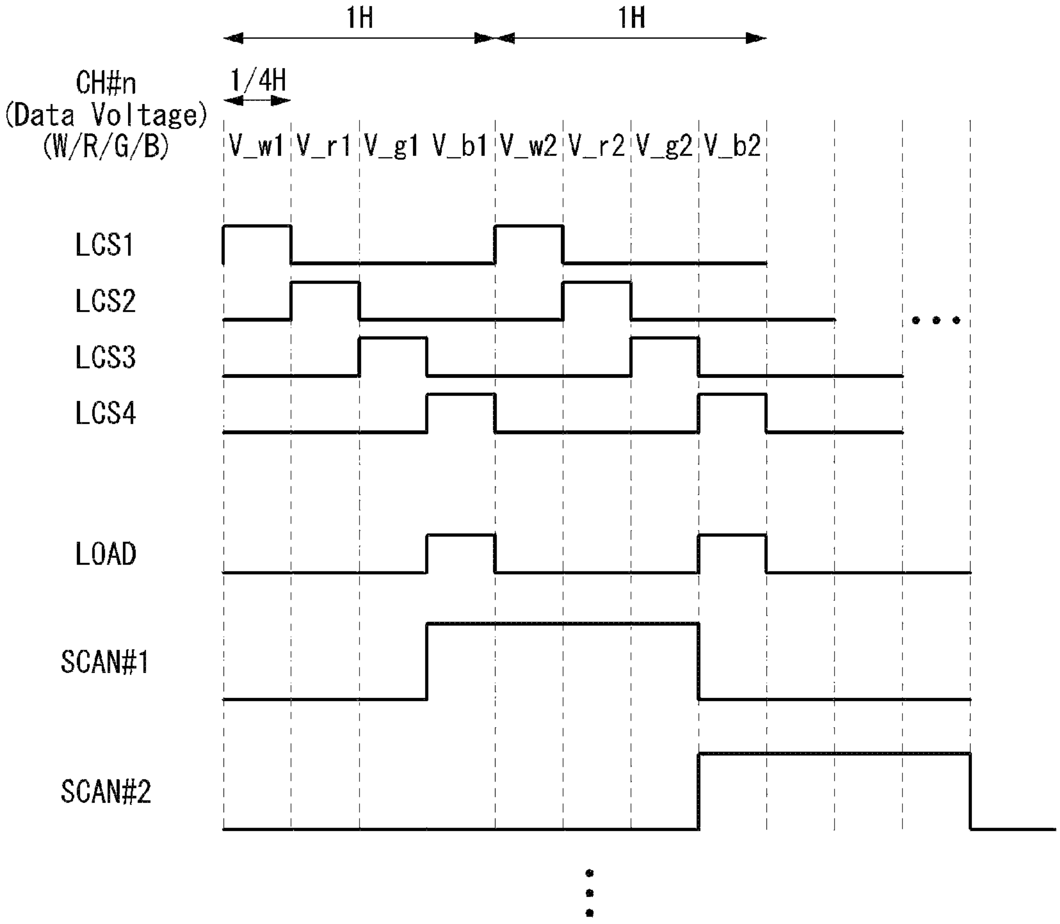
FIG. 10 is a timing diagram illustrating timing of scan signals for controlling operations of pixels of a display panel and a latch unit of FIG. 9 according to one embodiment.

FIG. 9 is a view illustrating a latch unit latching a channel output of a source driver IC to be output to a data line; and FIG. 10 is a timing diagram illustrating timing of scan signals for controlling operations of pixels of a display panel and a latch unit of FIG. 9.

The latch unit 15 samples and holds the data voltage of each color sequentially input through each output channel CH to be simultaneously output to the data voltage DL of the corresponding color, and is composed of a sampling unit 151, a holding unit 152, and a buffer unit 153.

The sampling unit 151 may sample the data voltages V_w, V_r, V_g, and V_b of each color sequentially input by dividing one horizontal period into equal time intervals through one output channel CH #n, to respectively generate sampling signals Ws, Rs, Gs, and Bs in a separate manner for each color. The sampling unit 151 includes sampling latch units SL (W), SL (R), SL (G), and SL (B) for each color, and each sampling latch unit may sample a data voltage of the corresponding color in synchronization with the corresponding latch control signal among latch control signals LCS1 to LCS4 supplied by the control signal generating circuit 14, to separate a data voltage of the corresponding color.

The first latch control signal LCS1 is output as a pulse in a turn-on state for the first 1/4H of one horizontal period, and the sampling latch unit SL(W) for white color samples the white data voltage V_w output for the first 1/4H from the output channel CH #n in accordance with the first latch control signal LCS1, thereby generating sampling signal Ws.

The second, third, and fourth latch control signals LCS2, LCS3, and LCS4 are output as pulses in a turn-on state for the second, third and fourth 1/4H of one horizontal period, respectively, and the sampling latch units SL (R), SL (G), and SL (B) for red, green and blue colors sample the red, green and white data voltages V_r, V_g, and V_b output for the second, third, and fourth 1/4H from the channel CH #n according to the second, third and fourth latch control signals LCS2, LCS3, and LCS4, respectively, thereby generating red, green and blue sampling signals Rs, Gs, and Bs.

The holding unit 152 is composed of white, red, green, and blue holding latch units HL (W), HL (R), HL (G), and HL (B), and maintains the sampling signal Ws, Rs, Gs, and Bs for each color output by the sampling unit 151 for one horizontal period, in synchronization with a load signal LOAD supplied by the control signal generating circuit 14, to respectively output holding signals Wh, Rh, Gh, and Bh for each color. Herein, the load signal LOAD may have a pulse width of 1/4H and is synchronized with the fourth latch control signal LCS4 which is the last latch control signal as shown in FIG. 10.

The buffer unit 153 is composed of white, red, green, and blue buffers BUF (W), BUF (R), BUF (G), and BUF (B), and allows the holding signals Wh, Rh, Gh, and Bh for each color output by the holding unit 152 to drive corresponding data lines DL (W), DL (R), DL (G), and DL (B).

The gate driving circuit 13 may sequentially generate a scan signal that transitions to a turn-on level in synchronization with the load signal LOAD, to be sequentially supplied to pixels of each horizontal line.

Figure 11:
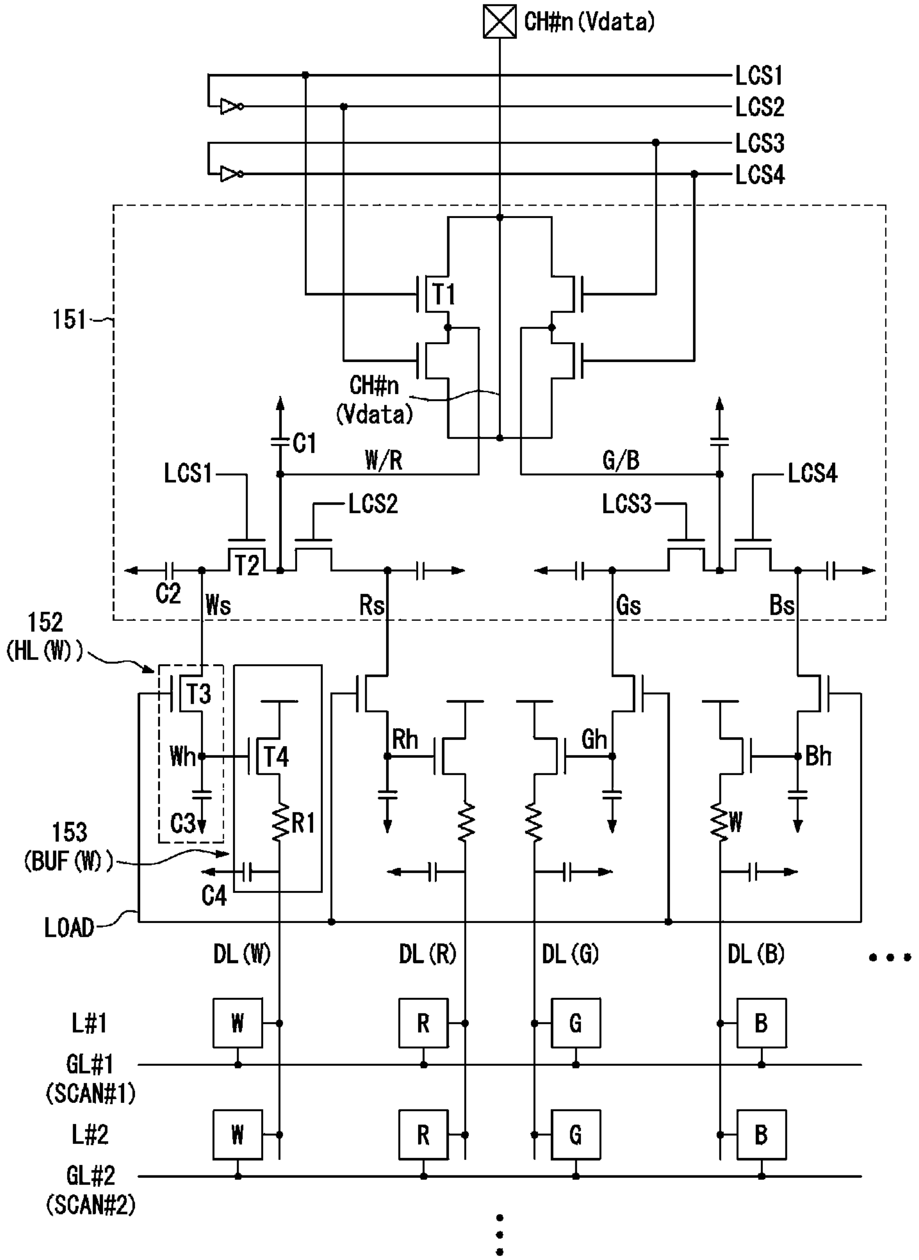
FIG. 11 is a specific circuit diagram illustrating a latch unit of FIG. 9 according to one embodiment.
Figure 12:
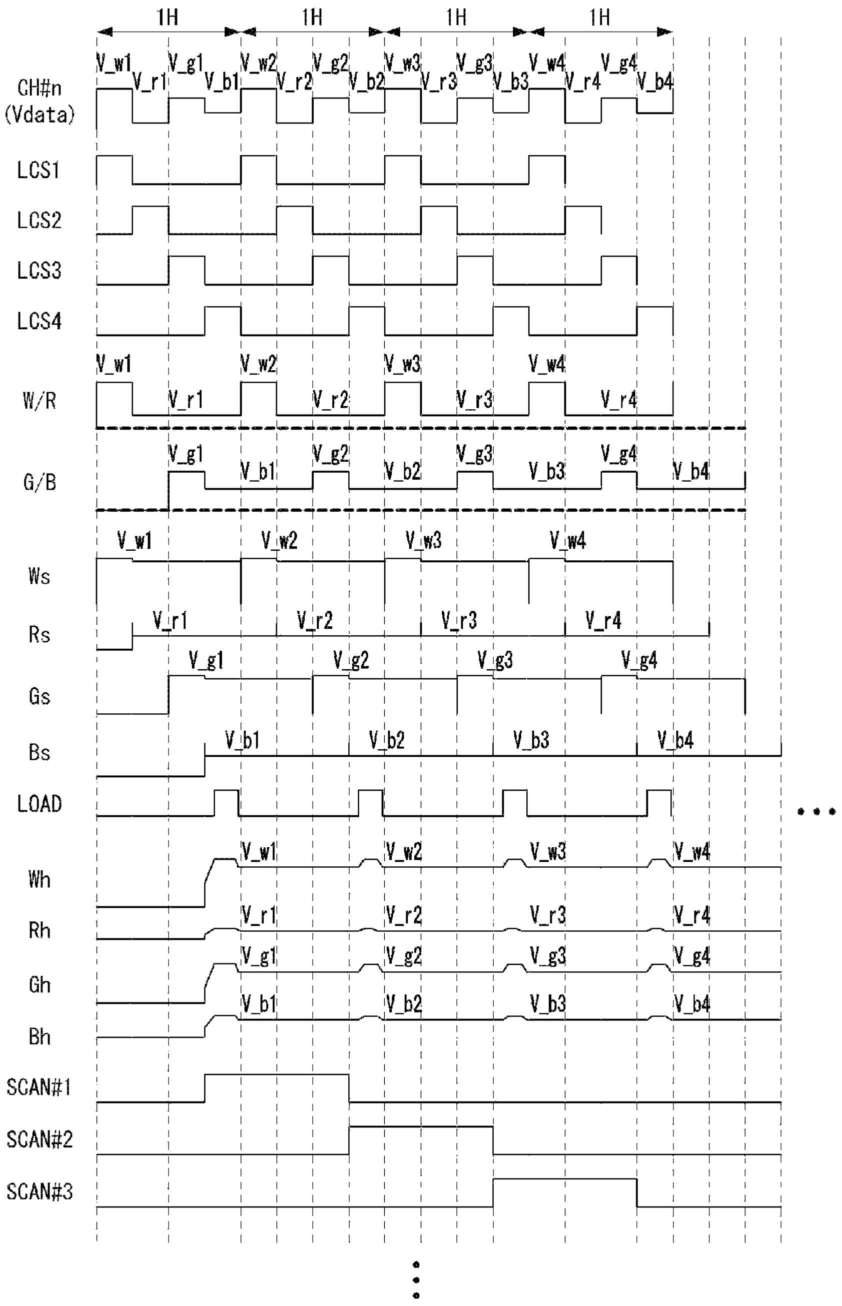
FIG. 12 is a timing diagram illustrating timing of signals related to an operation of a latch circuit of FIG. 11 according to one embodiment.

FIG. 11 is a specific circuit diagram illustrating a latch unit of FIG. 9; and FIG. 12 is a timing diagram illustrating timing of signals related to an operation of a latch circuit of FIG. 11.

In FIG. 12, the n-th channel CH #n outputs the data voltage Vdata at 1/4H intervals. That is, the n-th channel CH #n outputs data voltages V_w1, V_r1, V_g1, and V_r1 for white, red, green, and blue colors in the first horizontal period, outputs data voltages V_w2, V_r2, V_g2, and V_r2 for white, red, green, and blue colors in the second horizontal period, and sequentially outputs data voltages of each color in a similar manner in the third and fourth horizontal periods.

The first to fourth latch control signals LCS1, LCS2, LCS3, and LCS4 are sequentially output at a 1/4H pulse width in synchronization with the data voltage output of the channel.

In FIG. 11, the sampling latch unit 151 for white color (e.g., SL (W)) may be configured to include first/second TFTs T1 and T2 and first/second capacitors C1 and C2. The first latch control signal LCS1 is input to the gate electrodes of the first/second TFTs T1 and T2, so that the white data voltage V_w input for the first 1/4H of one horizontal period is sampled to generate the white sampling signal Ws.

In FIG. 11, the first TFTs T1 of the sampling latch unit 151 for white color (e.g. SL(W) and the sampling latch unit SL(R) for red color are connected in series with each other and share an output line with each other to output a W/R signal, so that the W/R signal is output as the white data voltage V_w for the first 1/4H by the first latch control signal LCS1 and output as the red data voltage V_r for the second 1/4H to fourth 1/4H.

However, since the W/R signal is sampled again through the second TFTs T2 using different latch control signals LCS1 and LCS2, the sampling latch unit SL(W) for white color outputs the white data voltage V_w as a white sampling signal Ws, and the sampling latch unit SL(R) for the red color outputs the red data voltage V_r as a red sampling signal Rs.

In FIG. 11, the first TFTs T1*s* of the sampling latch unit SL(G) for green color and the sampling latch unit SL(B) for blue color are connected in series with each other and share an output line with each other to output a G/B signal. As described above, the G/B signal may be separated into the green data voltage V_g and the blue data voltage V_b through the second TFTs T2 using different latch control signals LCS3 and LCS4, which are sampled into a green sampling signal Gs and a blue sampling signal Bs, respectively.

The white, red, green, and blue sampling signals Ws, Rs, Gs, and Bs outputs the white, red, green, and blue data voltages V_w, V_r, V_g, and V_b, in a state that is sequentially delayed by 1/4H.

In FIG. 11, the holding latch unit 152 for white color (e.g., HL (W)) is configured to include a third TFT (T3) and a third capacitor C3, and converts the white sampling signal Ws into a white holding signal Wh according to the load signal LOAD to output the white holding signal Wh to a white buffer BUF(W).

The holding latch units for white, red, green and blue color are all synchronized with the same load signal LOAD, and thus outputs white, red, green and blue holding signals Wh, Rh, Gh, and Bh to the buffer corresponding to the respective data voltages at the same timing.

Although it has been described that the second TFT and the second capacitor belong to the sampling latch unit in the foregoing, it is also possible that the second TFT and the second capacitor belong to the holding latch unit.

The white buffer 153 (e.g., BUF (W)) is configured to include a fourth TFT, a resistor R1, and a fourth capacitor C4, and constantly outputs the white holding signal Wh to the white data line DL(W) for one horizontal period. Similarly, to the white buffer, red, green and blue buffers also output red, green and blue holding signals Rh, Gh, and Bh to red, green, and blue data lines DL(R), DL(G), and DL(B) for one horizontal period, respectively.

The scan signal SCAN sequentially outputs a scan pulse maintaining a turn-on level for at least 1/4H in synchronization with the load signal LOAD, thereby allowing the data voltage supplied to the data line DL to be supplied to the pixels of the connected pixel line.

As shown in FIG. 12, since only one scan signal is supplied to the pixel line, since the number of gate lines does not increase unlike the DRD method, there is no need to increase the driving speed of the gate driving circuit, and there is no reduction in the aperture ratio of the pixel. In addition, the pulse of the scan signal is also maintained for one horizontal period or more to have sufficient time to apply the data voltage to the pixel.

In addition, since the buffer unit supplies a constant data voltage to each data line DL for one horizontal period, it is possible to secure the sufficient time to charge the data line DL and thus to supply an accurate data voltage to the pixel, compared to a method of employing a demultiplexer that charges the data line DL only for a shorter period than one horizontal period when the latch TFT is turned on.

In addition, since the source driver IC outputs only one output channel to a unit pixel, the chip size of the source driver IC can be reduced. Since the number of data lines capable of being handled by one source driver IC increases, the number of source driver ICs can be reduced.

Figure 13:
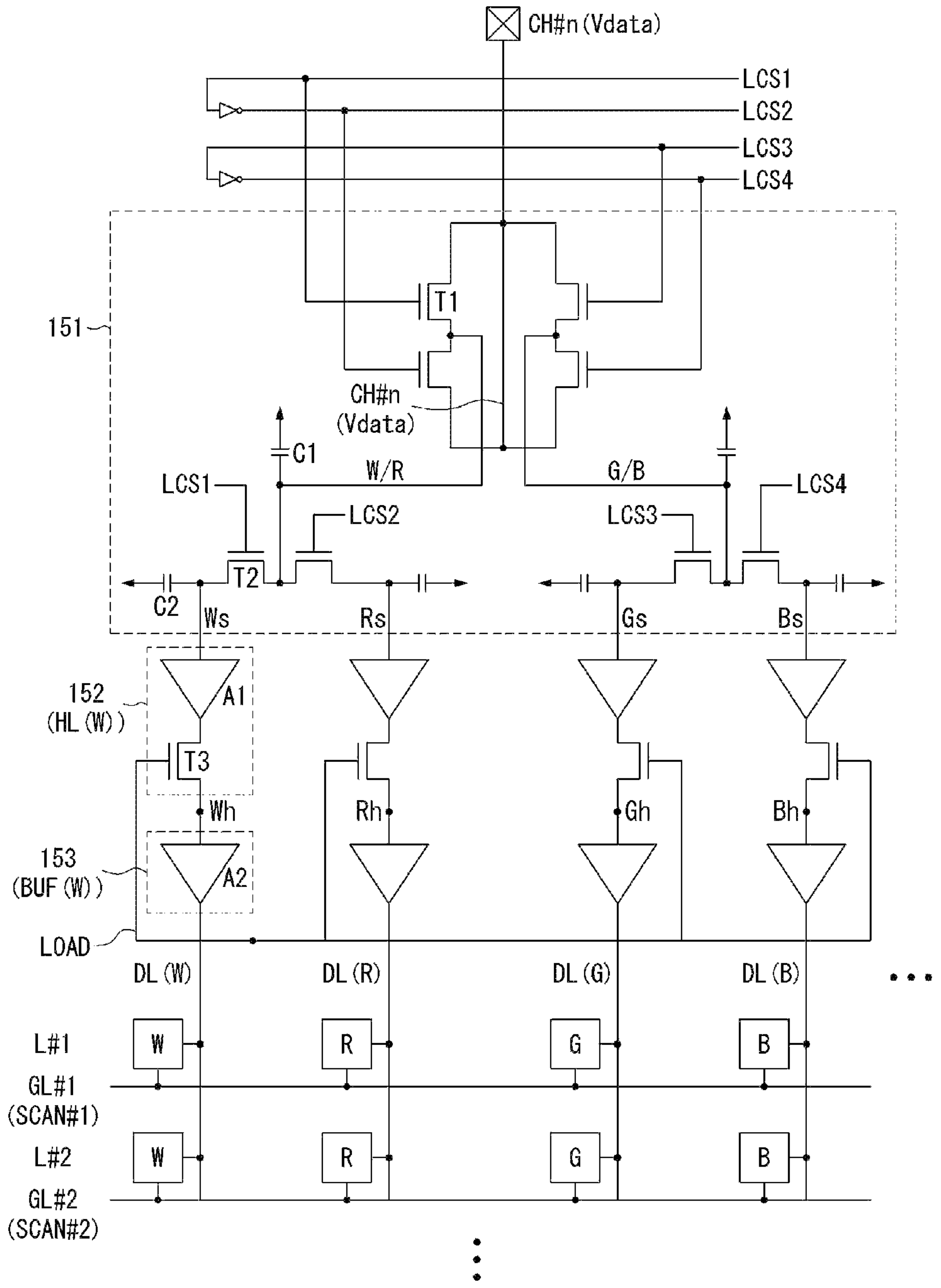
FIG. 13 is a specific circuit diagram illustrating a modification of a latch unit of FIG. 11 according to one embodiment.

FIG. 13 is a specific circuit diagram illustrating a modification of a latch unit of FIG. 11.

The latch circuit of FIG. 13 is different from that of FIG. 11 in that an amplifier A1 is added between the sampling latch unit 151 and the holding latch unit 152, and the buffer 153 is composed of an amplifier A2 instead of a switch such as a TFT.

Leakage occurs in the current due to switching operations of various TFTs, and it may be seen, as shown in FIG. 12, that the voltage of the sampling signals Ws, Rs, Gs, and Bs output by the sampling latch unit is affected by the instantaneous switching operation, and a ripple is generated in the holding signals Wh, Rs, Gs, and Bs due to the switching operations.

The amplifier A1 may be added between the sampling latch unit 151 and the holding latch unit 152 and be configured as a non-inverting amplifier to reduce the influence due to the switching operation. In addition, the buffer is not constituted using a TFT as shown in FIG. 11, but is constituted with a non-inverting amplifier using the amplifier A2, whereby it is possible to stably drive the data line with little voltage change.

The display device described in the specification can be described as follows.

A display device according to an embodiment includes a display panel in which a plurality of unit pixels composed of n sub-pixels (where n is a natural number of 2 or more) connected to a data line and a gate line are arranged; a data driving circuit sequentially outputting n data voltages through a first output channel for one horizontal period; a latch circuit sequentially sampling the n data voltages input through the first output channel and providing the sampled n data voltages simultaneously to n data lines while maintaining the same for one horizontal period including a first time point at which a n-th data voltage is sampled; and a gate driving circuit supplying a scan signal to the gate line in synchronization with the data voltage supplied to the data line.

According to an embodiment, the latch circuit may be configured to include a sampling unit sequentially sampling the n data voltages input through the first output channel to maintain the n data voltages for the one horizontal period; and a holding unit maintaining the n data voltages for one horizontal period after the first time point.

According to an embodiment, the sampling unit may have a pulse width of a first period obtained by dividing the one horizontal period by n and samples the n data voltages in synchronization with n control signals each delayed by the first period, and the holding unit may maintain the n data voltages for the one horizontal period according to a load signal.

According to an embodiment, the load signal may be synchronized with a n-th control signal among the n control signals and have a pulse width of the first period.

According to an embodiment, the latch circuit may be configured to further include a buffer unit for supplying n data voltages output from the holding unit to the data line.

According to an embodiment, the gate driving circuit may sequentially output a scan signal having a pulse width of the one horizontal period in synchronization with the load signal.

According to an embodiment, the display device may further include a timing controller controlling the data driving circuit and the gate driving circuit to output image data through the display panel, wherein the timing controller generates the n control signals and the load signal and supplies the same to the latch circuit.

According to an embodiment, the display device may further include a timing controller controlling the data driving circuit and the gate driving circuit to output image data through the display panel, wherein the timing controller separates image data to be supplied to a plurality of sub-pixels constituting one display line into n colors and stores the image data in a line memory provided for each color, and outputs the image data of each color stored in the line memory to the data driving circuit at intervals of a first period obtained by dividing the one horizontal period by n.

According to an embodiment, the data driving circuit may operate in units of the first period, to receive image data of one color from the timing controller for the first period and to output data voltage for one color to the latch circuit through the first output channel each for the first period.

According to an embodiment, the display device may further include a timing controller controlling the data driving circuit and the gate driving circuit to output image data through the display panel, wherein the data driving circuit receives image data to be supplied to a plurality of sub-pixels constituting one display line for the one horizontal period from the timing controller, and multiplexes the n data voltages into the first output channel at intervals of the first period through a multiplexer, among data voltages converted from the image data.

Through the above description, those skilled in the art will appreciate that various changes and modifications are possible without departing from the technical spirit of the present invention. Therefore, the technical scope of the present invention is not limited to the contents described in the detailed description of the specification, but should be determined by the scope of the claims.

What is claimed is:

1. A display device, comprising:

a display panel in which a plurality of unit pixels composed of n sub-pixels (where n is a natural number of 2 or more) connected to a data line and a gate line are arranged;

a data driving circuit sequentially outputting n data voltages through a first output channel for one horizontal period;

a latch circuit sequentially sampling the n data voltages input through the first output channel and providing the sampled n data voltages simultaneously to n data lines while maintaining the n data voltages for one horizontal period including a first time point at which a n-th data voltage is sampled; and a gate driving circuit supplying a scan signal to the gate line in synchronization with the n data voltages supplied to the n data lines, wherein the latch circuit is configured to include:

a sampling unit sequentially sampling the n data voltages input through the first output channel to maintain the n data voltages for the one horizontal period; and a holding unit outputting holding signals to maintain the n data voltages for one horizontal period after the first time point, and wherein the sampling unit has a pulse width of a first period obtained by dividing the one horizontal period by n and samples the n data voltages in synchronization with n control signals each delayed by the first period, and wherein the holding unit outputs the holding signals to maintain the n data voltages for the one horizontal period according to a load signal.

2. The display device of claim 1, wherein the load signal is synchronized with a n-th control signal among the n control signals and has a pulse width of the first period.

3. The display device of claim 1, wherein the latch circuit is configured to further include a buffer unit for supplying n data voltages output from the holding unit to the data line.

4. The display device of claim 1, wherein the gate driving circuit sequentially outputs a scan signal having a pulse width of the one horizontal period in synchronization with the load signal.

5. The display device of claim 1, further comprising:

a timing controller controlling the data driving circuit and the gate driving circuit to output image data through the display panel, wherein the timing controller generates the n control signals and the load signal and supplies the n control signals and the load signal to the latch circuit.

6. The display device of claim 1, further comprising:

a timing controller controlling the data driving circuit and the gate driving circuit to output image data through the display panel, wherein the timing controller separates image data to be supplied to a plurality of sub-pixels constituting one display line into n colors and stores the image data in a line memory provided for each of the n colors, and outputs the image data of each n color stored in the line memory to the data driving circuit at intervals of a first period obtained by dividing the one horizontal period by n.

7. The display device of claim 6, wherein the data driving circuit operates in units of the first period, to receive image data of one n color from the timing controller for the first period and to output data voltage for one n color to the latch circuit through the first output channel each for the first period.

8. The display device of claim 1, further comprising a timing controller controlling the data driving circuit and the gate driving circuit to output image data through the display panel, wherein the data driving circuit receives image data to be supplied to a plurality of sub-pixels constituting one display line for the one horizontal period from the timing controller, and multiplexes the n data voltages into the first output channel at intervals of the first period through a multiplexer, among data voltages converted from the image data.

* * * * *